(12) United States Patent
Srinivas et al.

(10) Patent No.: US 11,292,435 B2
(45) Date of Patent: Apr. 5, 2022

(54) COMPOSITE BLADE DESIGN

(71) Applicant: ROSEMOUNT AEROSPACE INC., Burnsville, MN (US)

(72) Inventors: Nouduri Phani Srinivas, Bangalore (IN); Venkata Anil Kumar Mothe, Karnataka (IN); Sujoy Khanra, Karnataka (IN); Elbert Jeyapaul, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 206 days.

(21) Appl. No.: 16/289,032

(22) Filed: Feb. 28, 2019

(65) Prior Publication Data

US 2020/0108799 A1 Apr. 9, 2020

(51) Int. Cl.
*B60S 1/38* (2006.01)
*B60S 1/34* (2006.01)

(52) U.S. Cl.
CPC ............ *B60S 1/3849* (2013.01); *B60S 1/3427* (2013.01); *B60S 2001/3898* (2013.01)

(58) Field of Classification Search
CPC ........ B60S 1/38; B60S 1/3844; B60S 1/3849; B60S 1/3427; B60S 1/40; B60S 2001/3844; B60S 2001/3836; B60S 1/546; B60S 1/3434; B60S 1/344; B60S 1/32; B60S 1/3855

USPC .......... 15/250.361, 250.43, 250.32, 250.001, 15/245, 245.1; 522/187
See application file for complete search history.

(56) References Cited

U.S. PATENT DOCUMENTS

| | | | | |
|---|---|---|---|---|
| 1,755,059 A | * | 4/1930 | Gallagher, Jr. | ........... B60S 1/54 15/250.04 |
| 7,793,383 B2 | | 9/2010 | Espinasse et al. | |
| 2007/0294852 A1 | * | 12/2007 | Geilenkirchen | .......... B60S 1/38 15/250.361 |
| 2008/0016644 A1 | * | 1/2008 | Mizote | ....................... C08J 3/28 15/250.361 |

FOREIGN PATENT DOCUMENTS

| | | | | |
|---|---|---|---|---|
| CA | 2771977 A1 | * | 9/2013 | .............. B60S 1/524 |
| CN | 206124995 U | | 4/2017 | |
| DE | 102014226401 A1 | * | 12/2014 | ................ B60S 1/32 |
| DE | 102015215701 A1 | | 2/2017 | |
| JP | 2006131177 A | * | 11/2004 | ................ B60S 1/38 |
| JP | 2006232074 A | * | 5/2005 | ................ B60S 1/38 |
| TW | 201304987 A | * | 7/2011 | ............ B60S 1/3801 |

* cited by examiner

*Primary Examiner* — Katina N. Henson
(74) *Attorney, Agent, or Firm* — Cantor Colburn LLP

(57) ABSTRACT

A windshield wiper system (WWS) blade assembly is provided. The WWS blade assembly includes a composite frame and a blade that has a length which is normally shorter than a corresponding length of the composite frame. The blade includes first and second ends attachable to corresponding first and second ends of the composite frame, respectively.

13 Claims, 3 Drawing Sheets

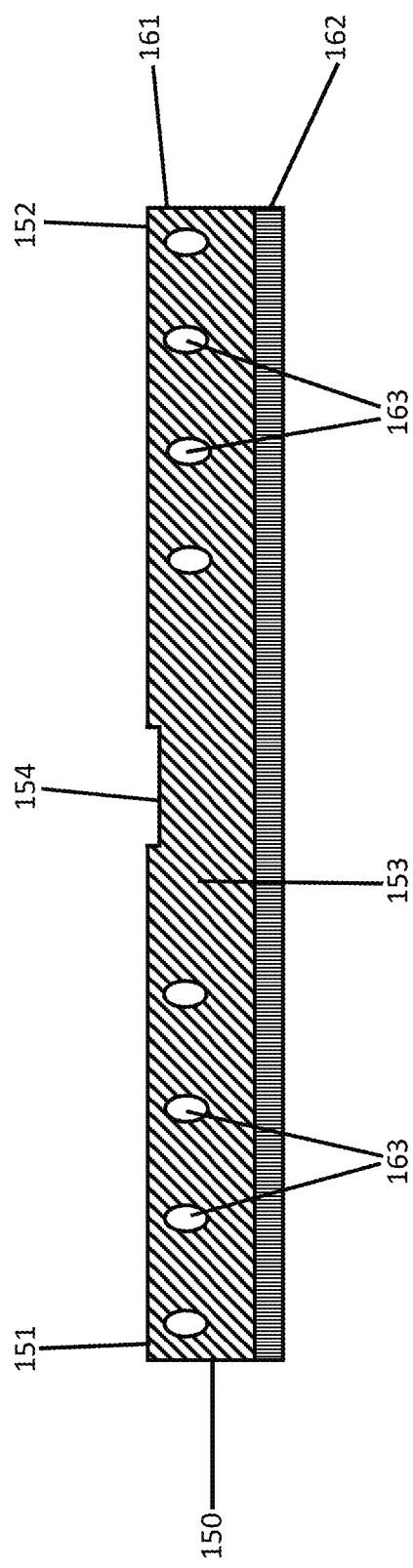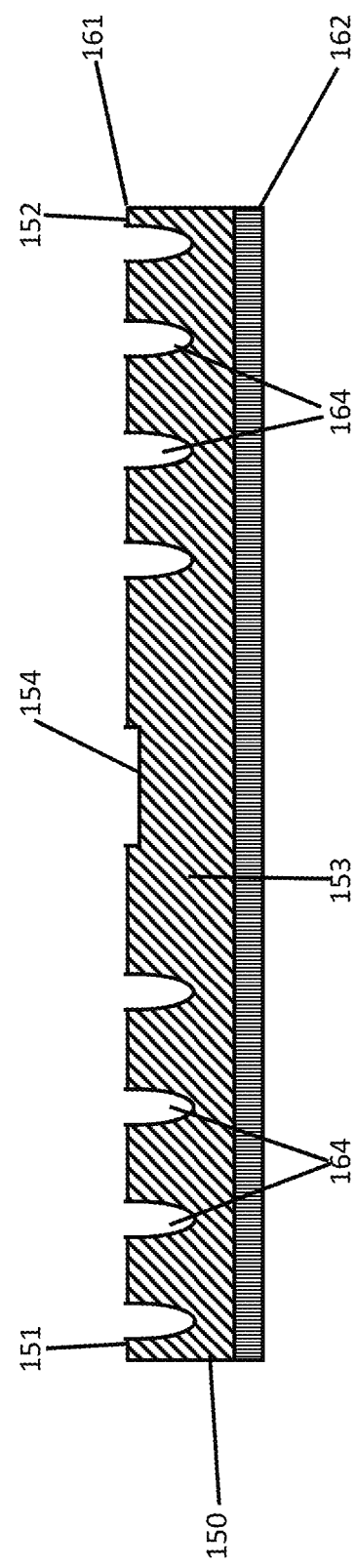

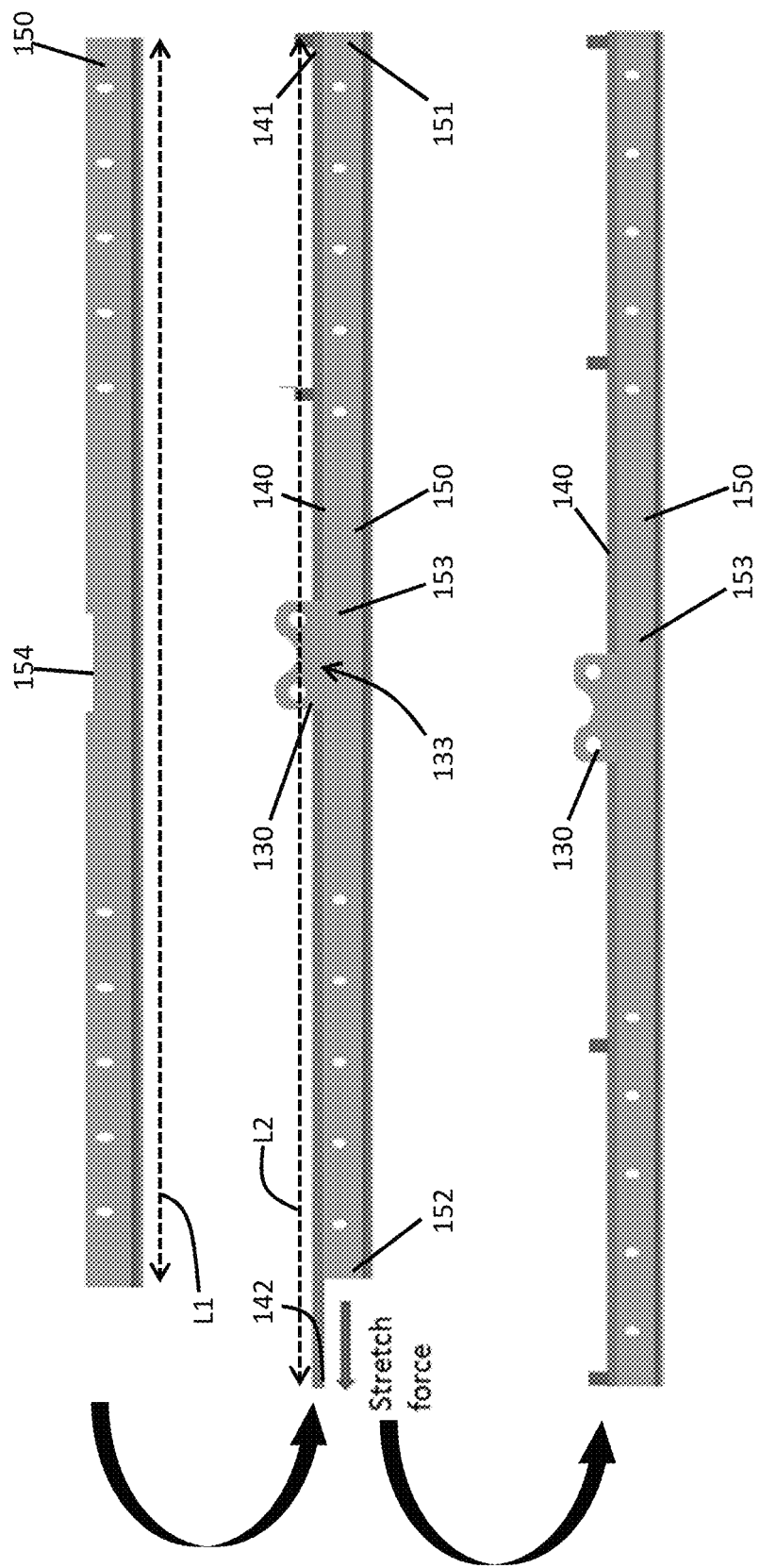

COMPOSITE BLADE DESIGN

CROSS-REFERENCE TO RELATED APPLICATIONS

This application claims the benefit of Indian Patent Application No. 201811037759 filed Oct. 5, 2018, which is incorporated herein by reference in its entirety.

BACKGROUND

The following description relates to windshield wiper systems (WWSs) and, more specifically, to a composite blade design for a WWS.

A WWS of an aircraft is used for cleaning rain, sand, dust, etc. from a windshield. Generally, a WWS includes a wiper arm and a blade that needs to move in both clockwise and counter-clockwise directions within a specific angle to keep the windshield clean for the pilot/co-pilot to have good visibility. The wiper arm is typically moved by a shaft that is connected to a motor through gearing but there are various design configurations available and each has its own advantages and disadvantages.

Existing blade assemblies for wiper arms of WWSs typically have a frame and a blade. The frame often has a bridge-type construction with various riveted links. The blade is assembled onto the frame by clips. All components of the frame are usually made of stainless steel. As such, current blade assemblies can have tips that bend and overshoot a required sweep angle at high speed mode operations due to a number of riveted links in the frame and a frame inertia due to stainless steel links. In addition, current blade assemblies can have substantial aerodynamic drag due to their bridge-type frame construction.

BRIEF DESCRIPTION

According to an aspect of the disclosure, a windshield wiper system (WWS) blade assembly is provided. The WWS blade assembly includes a composite frame and a blade that has a length which is normally shorter than a corresponding length of the composite frame. The blade includes first and second ends attachable to corresponding first and second ends of the composite frame, respectively.

In accordance with additional or alternative embodiments, the composite frame includes carbon fiber.

In accordance with additional or alternative embodiments, the blade includes nitrile rubber.

In accordance with additional or alternative embodiments, at least the blade includes a ceramic coating.

In accordance with additional or alternative embodiments, the blade is formed to define through-holes.

In accordance with additional or alternative embodiments, the blade is adhered to the composite frame along a substantial fraction of the length thereof.

In accordance with additional or alternative embodiments, the blade is formed to define grooves.

In accordance with additional or alternative embodiments, the blade is adhered to the composite frame between the grooves and at the first and second ends outside the grooves.

According to another aspect of the disclosure, a windshield wiper system (WWS) blade assembly is provided. The WWS blade assembly includes a holder element, a composite frame received within the holder element and a blade that has a length which is normally shorter than a corresponding length of the composite frame. The blade includes first and second ends attachable to corresponding first and second ends of the composite frame, respectively, and a body extending between the first and second ends and formed to define a cutout for receiving a corresponding portion of the holder element.

In accordance with additional or alternative embodiments, the holder element includes a base and sidewalls extending from opposite edges of the base.

In accordance with additional or alternative embodiments, the composite frame includes carbon fiber.

In accordance with additional or alternative embodiments, the blade includes nitrile rubber.

In accordance with additional or alternative embodiments, at least the blade includes a ceramic coating.

In accordance with additional or alternative embodiments, the blade is formed to define through-holes.

In accordance with additional or alternative embodiments, the blade is adhered to the composite frame along a substantial fraction of the length thereof.

In accordance with additional or alternative embodiments, the blade is formed to define grooves.

In accordance with additional or alternative embodiments, the blade is adhered to the composite frame between the grooves and at the first and second ends outside the grooves.

According to yet another aspect of the disclosure, a method of assembling a windshield wiper system (WWS) blade assembly is provided. The method includes receiving a composite frame within a holder element, forming a blade that has a length which is normally shorter than a corresponding length of the composite frame and defines a cutout for receiving a corresponding portion of the holder element, adhering a first end of the blade to a corresponding first end of the composite frame, stretching a second end of the blade toward a corresponding second end of the composite frame and adhering a body of the blade, which extends between the first and second ends, to the composite frame with the cutout receiving the corresponding portion of the holder element.

In accordance with additional or alternative embodiments, the method further includes forming the composite frame of carbon fiber, forming the blade of nitrile rubber and coating at least the blade with ceramic.

In accordance with additional or alternative embodiments, the method further includes forming at least one of through-holes and grooves in the blade.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 3 is a side view of a blade assembly with through-holes in accordance with embodiments;

FIG. 4 is a side view of a blade assembly with grooves in accordance with embodiments; and FIG. 5 is a flow diagram illustrating a method of assembling a blade assembly in accordance with embodiments.

DETAILED DESCRIPTION

Figure 1:
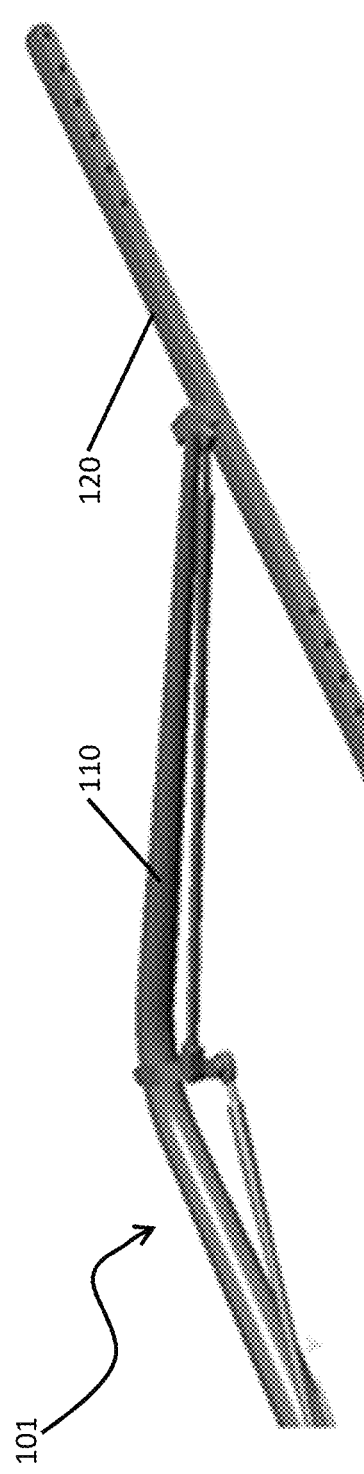
FIG. 1 is a perspective view of a blade assembly in accordance with embodiments.

As will be described below, a WWS blade is provided with a carbon fiber composite frame with a new blade design to improve the stiffness of the blade assembly and to reduce over-sweep. The use of carbon fiber composites offers improved unidirectional stiffness and variable properties compared to aluminum and steel.

With reference to FIGS. 1-4, a windshield wiper system (WWS) 101 is provided and includes a wiper arm 110 and a blade assembly 120. The blade assembly 120 includes a holder element 130, a composite frame 140 and a blade 150. The holder element 130 includes a base 131 and sidewalls 132. The sidewalls 132 extend in same directions from opposite edges of the base 131 to form a U-shaped cross-section. The composite frame 140 can be formed of carbon fiber and is receivable within the space delimited between the base 131 and the sidewalls 132 of the holder element 130. The blade 150 has a length L1 (see FIG. 5) which is normally shorter than a corresponding length L2 (see FIG. 5) of the composite frame 140. The blade 150 can be formed of nitrile rubber or another similar material and can have a ceramic coating. The blade 150 includes a first end 151 and a second end 152. The first end 151 is attachable to a corresponding first end 141 of the composite frame 140 and the second end 152 is attachable to a corresponding second end 142 of the composite frame 140. The blade 150 further includes a body 153 that extends between the first and second ends 151 and 152 and is formed to define a cutout 154 for receiving a corresponding portion 133 (i.e., the base 131 and proximal portions of the sidewalls 132) of the holder element 130.

In accordance with embodiments, the use of carbon fiber in the composite frame 140 increases a stiffness of the composite frame 140 and the blade assembly 120 as a whole. This increased stiffness is particularly notable in the direction transverse to the lengths L1 and L2 (see FIG. 5), which is directed into and out of the windshield to which the blade 150 contacts when installed.

As shown in FIG. 3, the body 153 of the blade 150 may have at least first and second sections 161 and 162. The first section 161 can be adhered to the composite frame 140 along a substantial fraction of the length L1 (see FIG. 5) and may be formed to define through-holes 163. The through-holes 163 can be arrayed in a linear arrangement along a length of the blade 150 and serve to allow for air flow passage through the blade 150, thereby reducing aerodynamic pressure drag. The second section 162 can be configured to contact a windshield and to remove moisture, foreign objects and debris from the windshield as the blade 150 moves across its surface. The second section 162 can include a tapered tip.

As shown in FIG. 4, the body 153 of the blade 150 may have at least the first and second sections 161 and 162. As noted above, the first section 161 can be adhered to the composite frame 140 and may be formed to define grooves 164. The grooves 164 can be arrayed in a linear arrangement along a length of the blade 150 at its surface where the blade is adhered to the composite frame 140. In this case, the blade 150 is adhered to the composite frame 140 between the grooves 164 and at the first and second ends 151 and 152 outside the grooves 164. The grooves 164 serve to allow for air flow passage through the blade 150 and the composite frame 140. The second section 162 can be configured to contact a windshield and to remove moisture, foreign objects and debris from the windshield as the blade 150 moves across its surface. The second section 162 can include a tapered tip.

Figure 2:
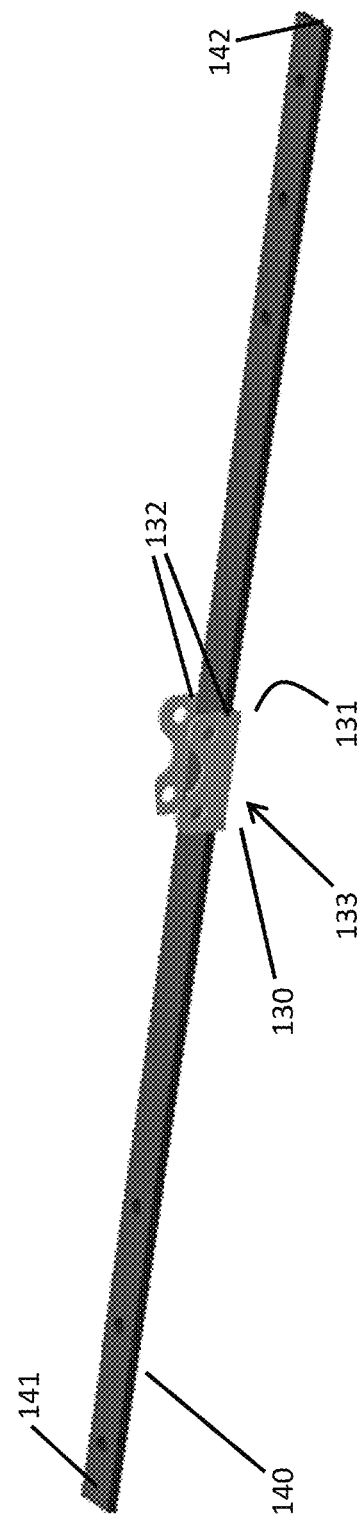
FIG. 2 is a perspective view of a composite frame and a holder element of a blade assembly in accordance with embodiments.

With continued reference to FIG. 2 and with additional reference to FIG. 5, a method of assembling a windshield wiper system (WWS) blade assembly is provided. The method includes receiving the composite frame 140 within the holder element 130 (see FIG. 2) and forming the blade 150. As shown in FIG. 5, the forming of the blade 150 is executed such that the blade 150 has the length L1, which is normally shorter than a corresponding length L2 of the composite frame 140, and such that the blade 150 defines the cutout 154 for receiving the corresponding portion 133 of the holder element 130.

The method further includes adhering the first end 151 of the blade 150 to the corresponding first end 141 of the composite frame 140, stretching the second end 152 of the blade 150 toward the corresponding second end 142 of the composite frame 140 and adhering the body 153 of the blade 150 to the composite frame 140 with the cutout 154 receiving the corresponding portion 133 of the holder element 130.

In accordance with embodiments, the adhering of any portion of the blade 150 (i.e., the first end 151, the body 153, etc.) can be accomplished with various adhesion elements such as adhesive, over-molding, rivets, etc.

As a result of the stretching of the body 153 of the blade 150 and elastic properties of the blade 150, the blade 150 will tend to contract and to pull the composite frame 140 into a curved configuration. This curved configuration can be designed to match with a curvature of a windshield as the wiper arm 110 (see FIG. 1) applies load through the blade assembly 120 and into the windshield.

Technical effects and benefits of the present disclosure are the provision of a blade assembly that complies with customer requirements and reduces over-sweep and damage to wiper externals and aircraft frame elements. In addition, the design of the blade assembly also reduces aerodynamic drag.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A windshield wiper system (WWS) blade assembly, comprising: a composite frame; and a blade that has a length which is shorter than a corresponding length of the composite frame in a condition in which the blade is unattached to the composite frame, the blade comprising: first and second ends attachable to corresponding first and second ends of the composite frame, respectively; a first section adhered to the composite frame and formed to define through-holes that each extend from a first side of the blade to a second side of the blade opposite the first side along a length of the blade to allow for air flow passage through the blade; and a second section configured to contact a windshield and including a tapered tip, wherein the first section of the blade is adhered with adhesive to the composite frame along the length thereof with the blade being stretched to the corresponding length of the composite frame, wherein said first end of the blade is adhered to the first end of the composite frame, the blade is stretched to the corresponding length of the composite frame and the second end of the blade is adhered to the second end of the composite frame, contracting and pulling the composite frame into a curved configuration.

2. The blade assembly according to claim 1, wherein the composite frame comprises carbon fiber.

3. The blade assembly according to claim 1, wherein the blade comprises nitrile rubber.

4. The blade assembly according to claim 1, wherein at least the blade comprises a ceramic coating.

5. The blade assembly according to claim 1, wherein the first section of the blade is untapered.

6. A windshield wiper system (WWS) blade assembly, comprising: a holder element; a composite frame received within the holder element; and a blade that has a length which is shorter than a corresponding length of the composite frame in a condition in which the blade is unattached to the composite frame, the blade comprising: first and second ends attachable to corresponding first and second ends of the composite frame, respectively; and a body extending between the first and second ends of the blade and formed to define a cutout for receiving a corresponding portion of the holder element and comprising: a first section adhered to the composite frame and formed to define through-holes that each extend from a first side of the blade to a second side of the blade opposite the first side along a length of the blade to allow for air flow passage through the blade; and a second section configured to contact a windshield and including a tapered tip, wherein the first section of the body of the blade is adhered with adhesive to the composite frame along the length thereof with the blade being stretched to the corresponding length of the composite frame, wherein said first end of the blade is adhered to the first end of the composite frame, the blade is stretched to the corresponding length of the composite frame and the second end of the blade is adhered to the second end of the composite frame, contracting and pulling the composite frame into a curved configuration.

7. The blade assembly according to claim 6, wherein the holder element comprises a base and sidewalls extending from opposite edges of the base.

8. The blade assembly according to claim 6, wherein the composite frame comprises carbon fiber.

9. The blade assembly according to claim 6, wherein the blade comprises nitrile rubber.

10. The blade assembly according to claim 6, wherein at least the blade comprises a ceramic coating.

11. The blade assembly according to claim 6, wherein the first section of the body of the blade is untapered.

12. A method of assembling a windshield wiper system (WWS) blade assembly, the method comprising:
receiving a composite frame within a holder element;
forming a blade that has a length which is shorter than a corresponding length of the composite frame in a condition in which the blade is unattached to the composite frame and defines a cutout for receiving a corresponding portion of the holder element;
adhering a first end of the blade to a corresponding first end of the composite frame with adhesive;
stretching a second end of the blade toward a corresponding second end of the composite frame such that the blade is stretched to the corresponding length of the composite frame and provided in a stretched condition;
adhering a first section of a body of the blade, which extends between first and second ends thereof, to the composite frame with the adhesive, with the blade provided in the stretched condition and with the cutout receiving the corresponding portion of the holder element;
forming through-holes that each extend from a first side of the blade to a second side of the blade opposite the first side in the first section of the body of the blade to allow for air flow passage through the blade; and
configuring a section of the body of the blade to contact a windshield and to include a taper.

13. The method according to claim 12, further comprising:
forming the composite frame of carbon fiber;
forming the blade of nitrile rubber; and
coating at least the blade with ceramic.

* * * * *